United States Patent
Inoue

(10) Patent No.: US 10,642,901 B2
(45) Date of Patent: May 5, 2020

(54) SORTING AN ARRAY CONSISTING OF A LARGE NUMBER OF ELEMENTS

(71) Applicant: INTERNATIONAL BUSINESS MACHINES CORPORATION, Armonk, NY (US)

(72) Inventor: Hiroshi Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 14/965,190

(22) Filed: Dec. 10, 2015

(65) Prior Publication Data

US 2016/0171030 A1  Jun. 16, 2016

(30) Foreign Application Priority Data

Dec. 12, 2014  (JP) .................................. 2014-252509

(51) Int. Cl.
  *G06F 16/903* (2019.01)
  *G06F 7/06* (2006.01)
  (Continued)

(52) U.S. Cl.
  CPC .......... *G06F 16/90348* (2019.01); *G06F 7/06* (2013.01); *G06F 7/22* (2013.01); *G06F 7/24* (2013.01)

(58) Field of Classification Search
  CPC ......... G06F 17/30988; G06F 17/30327; G06F 17/30625; G06F 17/3053; G06F 17/30961
  (Continued)

(56) References Cited

U.S. PATENT DOCUMENTS

| 5,640,554 A * | 6/1997 | Take .......................... G06F 7/36 707/999.007 |
| 8,190,943 B2 * | 5/2012 | Song .......................... G06F 7/32 713/500 |
| 8,478,755 B2 | 7/2013 | Lyon |
| 9,129,004 B2 | 9/2015 | Yaroslavskiy et al. |
| 2002/0065793 A1 * | 5/2002 | Arakawa .................... G06F 7/36 707/669 |

(Continued)

FOREIGN PATENT DOCUMENTS

| JP | H05197522 A | 8/1993 |
| JP | H0728841 A | 1/1995 |

(Continued)

OTHER PUBLICATIONS

Shi, Feng et al., "An Enhanced Multiway Sorting Network Based on n-Sorters", 2014 IEEE Global Conference on Signal and Information Processing (GlobalSIP); Dec. 3-5, 2014, IEEE Catalog No. CFP14GLS-ART; ISBN: 978-1-4799-7088-9 (Year: 2014).*

*Primary Examiner* — Shahid A Alam
(74) *Attorney, Agent, or Firm* — Vazken Alexanian; Randy E. Tejeda

(57) ABSTRACT

Sorting an array consisting of large number of elements. The present invention provides an apparatus for executing a multiway merging process which generates one output sequence from N input sequences on an array consisting of a large number of elements. The apparatus includes: an input sequence production unit configured to produce an input sequence by pairing a key from an element for use in a comparison during sorting with an index identifying the element for each element or sorted array of elements; an execution unit configured to execute the multiway merging process on N input sequences without rearranging the elements based on which input sequences have been produced; and a generation unit configured to rearrange the elements (Continued)

constituting the input sequences according to an output sequence that has been generated by the multiway merging process in the execution unit so as to generate a sorted array of elements.

17 Claims, 6 Drawing Sheets

(51) Int. Cl.
*G06F 7/24* (2006.01)
*G06F 7/22* (2006.01)

(58) Field of Classification Search
USPC .......................................................... 707/753
See application file for complete search history.

(56) References Cited

U.S. PATENT DOCUMENTS

2007/0156685 A1* 7/2007 Inoue .................. G06F 7/36
707/999.007
2011/0055492 A1 3/2011 Wu et al.

FOREIGN PATENT DOCUMENTS

| | | |
|---|---|---|
| JP | H07160475 A | 6/1995 |
| JP | H09292975 A | 11/1997 |
| JP | H1040076 A | 2/1998 |
| JP | 2000056947 A | 2/2000 |
| JP | 2001331353 A | 11/2001 |
| JP | 2009140161 A | 6/2009 |
| WO | 2009044486 A1 | 4/2009 |

\* cited by examiner

SORTING AN ARRAY CONSISTING OF A LARGE NUMBER OF ELEMENTS

CROSS REFERENCE TO RELATED APPLICATION

This application claims priority under 35 U.S.C. § 119 from Japanese Patent Application No. 2014-252509 filed Dec. 12, 2014, the entire contents of which are incorporated herein by reference.

TECHNICAL FIELD OF THE INVENTION

The present invention relates to an apparatus and method for sorting an array consisting of a large number of elements.

BACKGROUND OF THE INVENTION

Processing for sorting an array consisting of a large quantity of data elements according to the value of a key included in each data element is employed in many applications. Approaches for carrying out such a way of sorting are generally classified into two types. One of the approaches is to sort data directly. The other is to pair the key value of each data element with an index representing the position of the data element within an array and rearrange the order of the actual data elements according to the result of sorting such pairs. In the latter approach, all the pairs are sorted sequentially and then the actual data elements are rearranged based on indices arranged in order.

For example, a technique for implementing merge sort is disclosed in JP2000-56947A. In the technique, internal sorting is performed in each of input nodes for data to be sorted, which are distributed and stored in input local disks, and the results of the internal sorting are stored as multiple sorted sequences in a shared disk connected between the input nodes and an output node. When the output node receives a merge instruction from all of the input nodes, it reads and merges the sorted sequences from the shared disk before outputting the result of the overall sorting of the entire input data to an output local disk.

The above-mentioned approach of direct data sorting requires repetitive copying of actual data within the memory during sorting, leading to a large overhead associated with memory copy. Additionally, since keys are distributed in the memory, discontinuous memory accesses to keys occur, making it difficult to adopt an accelerating technique employing Single Instruction Multiple Data (SIMD) instructions for processing multiple data with a single instruction. In contrast, the aforementioned technique for rearranging data based on the results of pair sorting is suited for use with SIMD instructions because it does not require movement of actual data during sorting and also it only involves simple sorting of integers based on keys. However, in the final process of sorting pairs and rearranging data elements, random accesses that directly access data locations are performed in parallel. Consequently, an enormous number of cache misses or absence of required data in cache memory occur, resulting in an increased processing time. In addition, since a large number of memory accesses take place in parallel in the final process, the memory bandwidth during access from a central processing unit (CPU) to the memory creates a bottleneck and the effects of the SIMD technique cannot be expected.

SUMMARY OF THE INVENTION

An object of the present invention is to reduce the processing load associated with memory copy during execution of sorting and also deter occurrences of cache misses.

The present invention provides an apparatus for executing a multiway merging process which generates one output sequence from N input sequences on an array consisting of a large number of elements, the apparatus including: an input sequence production unit configured to produce an input sequence by pairing a key from an element for use in a comparison during sorting with an index identifying the element for each element or sorted array of elements; an execution unit configured to execute the multiway merging process on N input sequences without rearranging the elements based on which input sequences have been produced; and a generation unit configured to rearrange the elements constituting the input sequences according to an output sequence that has been generated by the multiway merging process in the execution unit so as to generate a sorted array of elements.

The present invention also provides an apparatus for merge-sorting an array consisting of a large number of elements by utilizing a multiway merging process which generates one output sequence from a plurality of input sequences, the apparatus including: a storage unit configured to store the array consisting of a large number of elements; and a sorted-array generation unit configured to: (i) produce an input sequence by pairing, for each element, a key for use in a comparison during sorting with an index identifying the element, where one element in the array consisting of a large number of elements or one sorted array of elements makes an input sequence for the multiway merging process, (ii) execute the multiway merging process on a plurality of input sequences without rearranging the elements based on which input sequences have been produced, and (iii) rearrange the elements stored in the storage unit in accordance with output sequences generated so as to generate a sorted array of elements which will make an input sequence for the multiway merging process at a following stage, wherein, after an initial stage of processing, processing by the sorted-array generation unit is iteratively executed using all of the large number of elements as the base of input sequences for the multiway merging process, processing at each stage following the initial stage is performed by executing processing that repeats the processing by the sorted-array generation unit using all sorted arrays that were generated by the multiway merging process in the preceding stage as the base of new input sequences for the multiway merging process, which generates a sorted array in which all of the large number of elements are sequentially sorted.

In addition, the present invention provides a method for executing a multiway merging process which generates one output sequence from N input sequences on an array consisting of a large number of elements, the method including the steps of: producing an input sequence by pairing, per element or sorted array of elements, a key from an element for use in a comparison during sorting with an index identifying the element; executing the multiway merging process on N input sequences without rearranging the elements based on which input sequences have been produced; and rearranging the elements, based on which the input sequences have been produced, according to an output sequence that has been generated by the multiway merging process in the executing step so as to generate a sorted array of elements.

The present invention can reduce the processing load associated with memory copy during execution of sorting and also deter occurrences of cache misses.

DETAILED DESCRIPTION OF THE PREFERRED EMBODIMENTS

An embodiment of the present invention will now be described in detail with reference to the accompanying drawings. A merge sort processing apparatus 10 according to an embodiment performs merge sorting on an array consisting of a large number of elements (e.g., structures). In the process of merge sorting, the merge sort processing apparatus 10 performs multiway merge which merges N input sequences to generate a single output sequence, where one structure or one sorted array of structures makes an input sequence. However, the multiway merge is carried out by iteratively performing two-way merge, N being an integer equal to or greater than 3.

The embodiment described below uses structures as an example of the data to be sorted and carries out sorting by rearranging structures present in an array consisting of a large number of structures. In the embodiment, however, the data to be sorted is not limited to structures.

Figure 1:
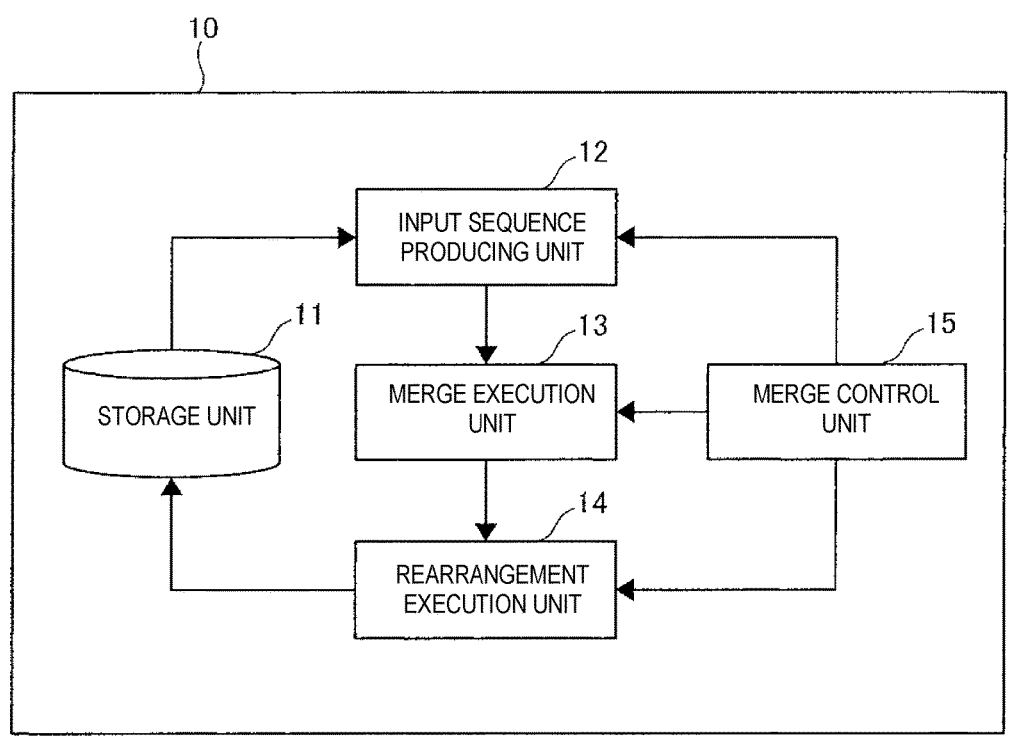
FIG. 1 is a block diagram illustrating an exemplary functional configuration of a merge sort processing apparatus according to an embodiment of the invention.

The functional configuration of the merge sort processing apparatus 10 according to an embodiment is described first. FIG. 1 is a block diagram showing an exemplary functional configuration of the merge sort processing apparatus 10 according to this embodiment. As illustrated, the merge sort processing apparatus 10 includes a storage unit 11 for storing an array consisting of a large number of structures, and an input sequence producing unit 12 which produces input sequences for multiway merge. The merge sort processing apparatus 10 also includes a merge execution unit 13 which executes merging on input sequences produced by the input sequence producing unit 12 to generate output sequences, and a rearrangement execution unit 14 which rearranges the structures in the storage unit 11 based on the output sequences generated by the merge execution unit 13. The merge sort processing apparatus 10 further includes a merge control unit 15 which controls a series of processes in which multiway merge is executed and structures are rearranged.

This embodiment uses the input sequence producing unit 12 and the merge execution unit 13 as examples of an execution unit. The rearrangement execution unit 14 is used as an example of a generation unit. The input sequence producing unit 12, the merge execution unit 13, and the rearrangement execution unit 14 are used as examples of a sorted-array generation unit. The storage unit 11 is used as an example of a storage unit.

The storage unit 11 stores an array consisting of a large number of structures, for which sorting is performed.

The input sequence producing unit 12 takes a key from a structure stored in the storage unit 11 and pairs the key with an index per structure or per sorted array of structures to produce an input sequence for multiway merge. A key is part of the data of a structure, being a value for use in comparisons conducted for arranging structures in sequence by sorting. That is, sorting is performed so that the key values of structures are arranged in ascending or descending order. A key is represented by a 32- or 64-bit integer, for example.

An index is data used in association with a key, serving as a value for identifying a structure. An index uniquely determines a structure among a large number of structures. At least indices as many as the number of all the structures stored in the storage unit 11 that should be sorted are prepared. Accordingly, the number of bits of the index is set so that it can identify all of the structures. As an example, in a case where the index is a 32-bit integer, 2 raised to the 32nd power structures can be identified. In the following description, a combination of a key and an index for one structure will be called a pair. A pair is a bit sequence combining the bit sequence of the key and that of the index, represented by an integer.

The merge execution unit 13 performs a multiway merging process according to key values on the N input sequences produced by the input sequence producing unit 12. In the process of multiway merge, the merge execution unit 13 merges the N input sequences to generate a single output sequence in which the N input sequences are arranged by sorting. The number of input sequences for multiway merge (=N) may be 8 or 16, for example, and is predefined in accordance with the processing performance of the merge sort processing apparatus 10 and/or the volume of the data to be sorted. The merge execution unit 13 performs processing for rearranging pairs, i.e., combinations of keys and indices: it does not actually rearrange structures in the storage unit 11. The merge execution unit 13 may also execute merging in parallel by using SIMD instructions.

The rearrangement execution unit 14 actually rearranges structures in the storage unit 11 according to output sequences generated by the merge execution unit 13 through multiway merge. More specifically, the rearrangement execution unit 14 identifies structures in the storage unit 11 that correspond to the indices contained in an output sequence and actually rearranges those structures in the storage unit 11 in accordance with the order in which the indices are arrayed in the output sequence.

The merge control unit 15 controls a series of processes in which multiway merge is executed and structures are rearranged. That is, the merge control unit 15 controls processing performed by the input sequence producing unit 12, the merge execution unit 13, and the rearrangement execution unit 14. Specifically, the merge control unit 15 controls a series of processes performed by the input sequence producing unit 12, the merge execution unit 13, and the rearrangement execution unit 14 such that they are conducted in sequence in multiple stages. In each stage, a series of processes by the input sequence producing unit 12, the merge execution unit 13, and the rearrangement execution unit 14 is executed either once or multiple times iteratively. In this embodiment, the series of processes performed in each stage is an example of the unit of processing.

For example, in an initial stage in which the processing by the merge sort processing apparatus 10 is started, the merge control unit 15 performs control such that a multiway merging process is iteratively executed multiple times on input sequences which are produced based on N structures among a large number of structures. Then, according to the output sequences generated by the merge execution unit 13, the rearrangement execution unit 14 actually rearranges the structures in the storage unit 11, based on which the input sequences have been produced, according to the order in which the indices are arrayed in the output sequences, thereby generating sorted arrays. Since multiple output sequences are generated as a result of repeated execution of multiway merge in the merge execution unit 13, the rearrangement execution unit 14 generates multiple sorted arrays in accordance with the multiple output sequences. After completion of processing at the initial stage in which a large number of structures make input sequences, the merge control unit 15 performs control so that processing at the following stage is started. In the following stage, a multiway merging process is performed on input sequences produced based on the sorted arrays generated in the initial stage.

For the second and subsequent stages, for example, the merge control unit 15 performs control so that a multiway merging process is iteratively executed multiple times for sets of N sorted arrays among the sorted arrays that were generated by multiway merge in the preceding stage. In accordance with multiple output sequences generated by the merge execution unit 13, the rearrangement execution unit 14 rearranges the structures in the storage unit 11, based on which the input sequences have been produced, thereby generating multiple sorted arrays. In the last stage, the merge control unit 15 performs control so that a multiway merging process is executed once for N sorted arrays from the sorted arrays that were generated by multiway merge in the preceding stage. Then, according to the single output sequence generated by the merge execution unit 13, the rearrangement execution unit 14 rearranges the structures in the storage unit 11 so as to generate a sorted array in which all of the large number of structures are sequentially sorted.

If the number of input sequences for multiway merge is less than N, the merge control unit 15 performs control so that a multiway merging process is executed on the less than N input sequences. For instance, when the number of sorted arrays generated in the preceding stage is (10N+2) at a certain stage, the merge control unit 15 performs control so that ten rounds of multiway merge are performed using 10N sorted arrays as the base of input sequences. As two sorted arrays are left, the merge control unit 15 performs control so that multiway merge is performed once using the two sorted arrays as the base of input sequences. That is, a total of eleven rounds of multiway merge would be performed in the stage. The merge execution unit 13 accordingly generates eleven sorted arrays as output sequences.

When the number of output sequences generated by multiway merge in the preceding stage is equal to or less than N, the number of input sequences for multiway merge will be equal to or less than N. In this case, the merge control unit 15 performs control so that multiway merge is performed once to generate a single output sequence. For example, given N=8, the number of sorted arrays would be equal to or less than N if the number of sorted arrays generated in the preceding stage is two to eight. Then, the merge control unit 15 performs control so that multiway merge is executed once using the two to eight sorted arrays as the base of input sequence. That is, this stage is the final stage, in which the rearrangement execution unit 14 generates a sorted array in which all of the large number of structures are sequentially sorted in accordance with the single output sequence generated by the merge execution unit 13.

If the number of output sequences generated in the initial stage is equal to or less than N, the merge control unit 15 performs control so that multiway merge is executed once in the processing at the following stage so as to generate a single output sequence. In this case, the stage following the initial stage (i.e., the second stage) will be the last stage. The rearrangement execution unit 14 then rearranges structures in accordance with the output sequence generated by the processing in the second stage by the merge execution unit 13 so as to generate a sorted array with all of the large number of structures sequentially sorted.

This embodiment uses the main memory as the storage unit 11. Processing by the input sequence producing unit 12 and the merge execution unit 13 is executed in cache memory. That is, the input sequence producing unit 12 reads structures stored in the main memory and produces input sequences. The merge execution unit 13 then performs a multiway merging process on the input sequences in the cache memory. Based on the output sequence generated as the output result of the multiway merge, the rearrangement execution unit 14 rearranges the structures in the main memory.

Figure 2:
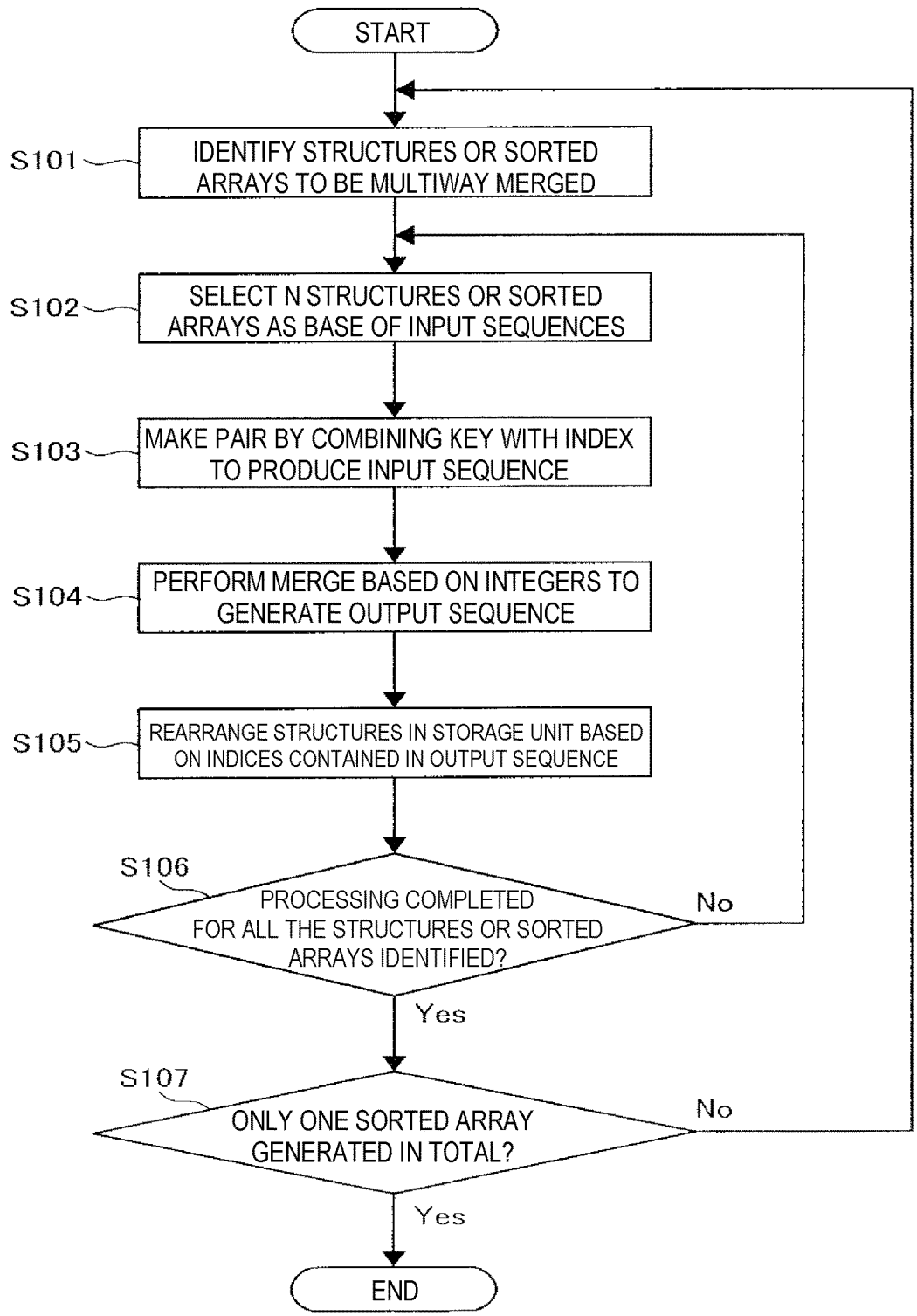
FIG. 2 is a flowchart illustrating an example of the procedure of a merge sorting process.

FIG. 2 is a flowchart illustrating an example of the procedure of a merge sorting process. It starts with the merge control unit 15 identifying structures or sorted arrays of structures for multiway merge in the storage unit 11 (Step 101). For example, in the initial state in which rearrangement has not been performed at all by the rearrangement execution unit 14 on the structures stored in the storage unit 11, the merge control unit 15 identifies the structures in the storage unit 11 as targets for multiway merge as the processing for the initial stage. For the processing at stages following the initial stage, for example, the merge control unit 15 identifies the sorted arrays in the storage unit 11 that were generated in the preceding stage as the target for multiway merge.

Next, the input sequence producing unit 12 selects N structures or sorted arrays as the base of input sequences from the structures or sorted arrays identified by the merge control unit 15 (Step 102). The input sequence producing unit 12 then takes the key from each of the N structures or the structures in the sorted arrays that have been selected, and makes a pair of the key and an index so as to produce an input sequence for multiway merge (Step 103). Here, a single structure or a block of sorted multiple structures makes an input sequence, and N input sequences for multiway merge are created.

For example, for the processing at the initial stage, the input sequence producing unit 12 creates one pair from each one of the N selected structures and provides it as an input sequence. The input sequence producing unit 12 thus creates N pairs from the N selected structures so as to produce N input sequences. In the processing at the stage following the initial stage, for example, the input sequence producing unit 12 selects N sorted arrays in each of which N structures are arranged as a block of sorted structures. The input sequence producing unit 12 then extracts one of the N arrays it selected, generates a sorted array in which N pairs are arranged from the sorted array in which N structures are arranged, and provides it as an input sequence. In this manner, the input sequence producing unit 12 generates N sorted arrays in each of which N pairs are arranged from the N arrays it selected, and provides them as N input sequences for multiway merge.

Next, the merge execution unit 13 performs merging by means of integers on the N input sequences based on key values, generating a single output sequence (Step 104). For example, for the processing in the initial stage in which one pair makes one input sequence, a single output sequence with N pairs merged and arranged is generated. As another example, for the processing in the stage following the initial stage in which a sorted array with N pairs arranged makes one input sequence, a single output sequence having N☐N pairs merged and arranged is generated. In the sorting at Step 104, parallel processing using SIMD is performed.

The rearrangement execution unit 14 then actually rearranges the structures in the storage unit 11 based on the indices contained in the output sequence(s) generated by multiway merge (Step 105). For example, for processing at the initial stage in which N pairs are contained in one output sequence, a sorted array in which the N structures constituting the input sequences are rearranged is generated in the storage unit 11. As another example, for processing in the stage following the initial stage in which N☐N pairs are contained in one output sequence, a sorted array in which the N☐N structures, based on which the input sequences have been produced, are rearranged is generated in the storage unit 11.

The merge control unit 15 then determines whether or not processing has been performed on all of the structures or sorted arrays identified at Step 101 that should be multiway-merged (Step 106). The merge control unit 15 determines here whether or not the processing at Steps 102 through 105 has been performed on all of the structures or sorted arrays that have been identified. If the determination at Step 106 results in negative (No), that is, any of the structures or sorted arrays identified by the merge control unit 15 has not undergone the processing at Steps 102 through 105, the flow proceeds to Step 102. The input sequence producing unit 12 then newly selects N structures or sorted arrays and proceeds to perform the processing at the current stage.

As a result, multiple sorted arrays in which structures in the storage unit 11 are rearranged are generated in each stage. In the last stage, however, only one output sequence is generated. If the determination at Step 106 results in positive (Yes), that is, the processing at Steps 102 through 105 is completed for all of the structures or sorted arrays that have been identified by the merge control unit 15, the processing at the current stage ends and the flow proceeds to Step 107.

The merge control unit 15 then determines whether the total number of sorted arrays generated by the rearrangement execution unit 14 is one or not (Step 107). If the total number of sorted arrays generated is one (Yes at Step 107), that is, only one sorted array was generated at Step 105 and the structures in the storage unit 11 were accordingly rearranged, it means that all of the large number of structures have been sequentially sorted. In this case, the processing at the last stage is completed and the process flow ends. However, if the total number of sorted arrays generated is two or greater (No at Step 107), that is, two or more sorted arrays were generated in Step 105, the flow proceeds to Step 101, where processing at the following stages is then performed.

At Step 107, the merge control unit 15 may instead determine whether or not the total number of output sequences generated by the merge execution unit 13 is one. In such an embodiment, if the total number of output sequences generated is one, it means all of the large number of structures have been sequentially sorted, upon which the processing at the last stage is completed and the process flow ends. If the total number of output sequences generated is two or greater, the flow proceeds to Step 101.

While the procedure illustrated in FIG. 2 shows that the rearrangement execution unit 14 rearranges structures according to the output sequence every time one round of multiway merge is completed, the present invention is not limited thereto. For example, the rearrangement execution unit 14 may instead collectively rearrange structures in multiple output sequences that have been generated after iteratively executing the multiway merging process multiple times in each stage.

Figure 3A:
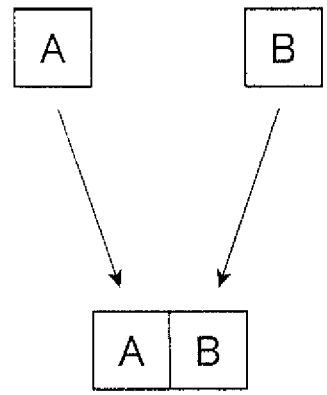
FIG. 3(a) is a diagram for describing an example of the two-way merge according to the embodiment.
Figure 4:
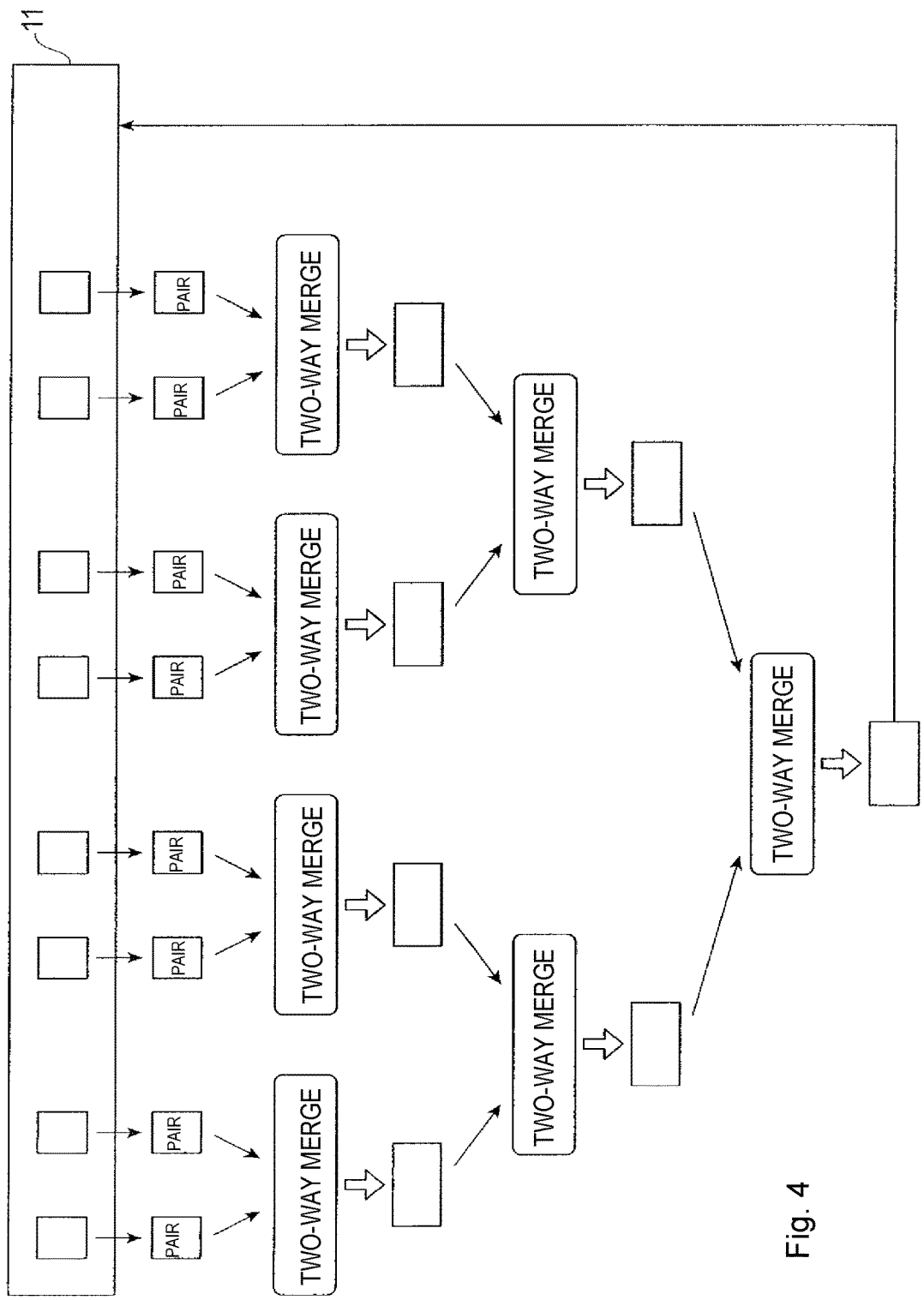
FIG. 4 is a diagram for describing an example of the multiway merge according to the embodiment.

Next, the multiway merging process used in this embodiment will be described in detail. The multiway merging is executed by iteratively performing two-way merging. FIGS. 3(a) and (b) are diagrams for describing an example of the two-way merge according to this embodiment. FIG. 4 is a diagram for describing an example of the multiway merge according to this embodiment.

First, as shown in FIGS. 3(a) and (b), in two-way merge, two input sequences are merged to generate a single output sequence. In a case in which the input sequences are pair A and pair B, for example, and each include only one pair as illustrated in FIG. 3(a), merging is carried out by comparison of pair A and pair B. That is, pair A and pair B are arranged in ascending or descending order and merged into one output sequence.

Figure 3B:
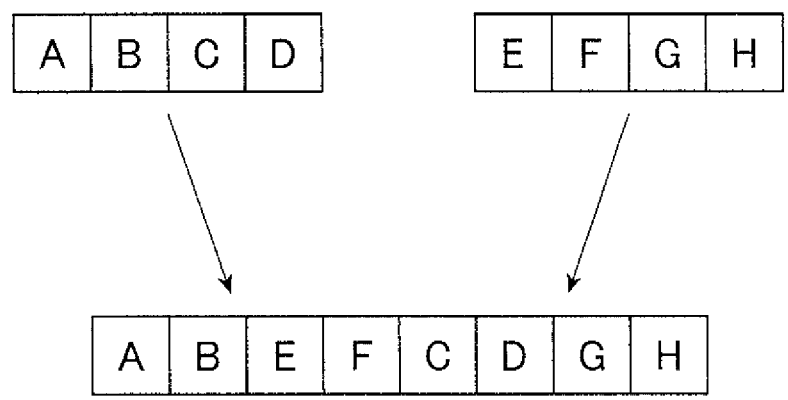
FIG. 3(b) is a diagram for describing an example of the two-way merge according to the embodiment.

In contrast, when the input sequences are pairs A to D and pairs E to H, for example, and each include multiple pairs (four in the example shown in FIG. 3(b)) as illustrated in FIG. 3(b), a comparison of the first elements of the input sequences is performed in sequence. As an example, in the case of arrangement in ascending order, a comparison of pair A and pair E, which are located first in the input sequences, is performed first, and the pair having the smaller value is placed first in the output sequence. Assuming that pair A has the smaller value, for example, pair A is placed as the first element in the output sequence, and then a comparison between pair B, which is now the first element of the input sequence, and pair E is performed. Assuming that pair B has the smaller value, for example, pair B is placed after pair A in the output sequence, and a comparison between pair C, which is now the first element in the input sequence, and pair E is further performed. Comparisons of pairs from the input sequences are thus performed in sequence so as to merge the pairs into a single output sequence.

Next, as shown in FIG. 4, in multiway merge, multiple input sequences are merged to finally generate a single output sequence. In the process, two-way merge is iteratively performed. The example shown in FIG. 4 is for a case where the number of input sequences for multiway merge is eight (N=8).

First, through the two-way merge at the first stage, four output sequences are generated from eight input sequences. In the two-way merge at the following stage, the output sequences generated in the first stage are the input sequences and two output sequences are generated from the four input sequences. Then, in the final two-way merge, the output sequences generated in the second stage are the input sequences and one output sequence is generated from the two input sequences. In this manner, when the number of input sequences is eight, three (=log 28) stages of two-way merging are performed to implement the multiway merging process.

For example, in the initial state in which rearrangement by the rearrangement execution unit 14 has not been performed at all on the structures stored in the storage unit 11, the input sequence producing unit 12 sequentially reads eight structures from the storage unit 11 according to, for example, a prestored order based on memory locations. The input sequence producing unit 12 then generates one pair per structure, producing eight input sequences. Next, the merge execution unit 13 iteratively performs two-way merge on the eight pairs and sequentially outputs a single output sequence in which the eight pairs are arranged by sorting. Then, based on the indices contained in the output sequence, the rearrangement execution unit 14 actually rearranges the eight structures in the storage unit 11. In the storage unit 11, structures that should be sorted are also present in addition to the eight structures. Thus, for the processing at the initial stage, multiway merge is similarly performed on the structures so that multiple sorted arrays in each of which eight structures are rearranged are generated in the storage unit 11.

In the processing at the stage following the initial stage, the input sequence producing unit 12 reads a sorted array with eight structures arranged from the storage unit 11. The input sequence producing unit 12 then generates a sorted array in which eight pairs are arranged from the sorted array with the eight structure arranged and provides it as an input sequence. In this way, the input sequence producing unit 12 generates a total of eight sorted arrays each having eight arranged pairs and provides them as eight input sequences for multiway merge. The merge execution unit 13 then iteratively executes two-way merge on the eight input sequences to generate a single output sequence. The output sequence contains 8□8=64 pairs. Based on the indices contained in the output sequence, the rearrangement execution unit 14 actually rearranges the 64 structures in the storage unit 11. Structures to be sorted are also present in addition to the 64 structures. Thus, for the processing at the stage following the initial stage, multiway merge is similarly performed, resulting in multiple sorted arrays each having 64 rearranged structures being generated in the storage unit 11.

As described above, the merge control unit 15 performs control so that processing in each stage is performed using multiple sorted arrays as the base of input sequences for multiway merge that were generated by the processing at the preceding stage and structures in the storage unit 11 are rearranged in each stage. When only one output sequence is generated by multiway merge at a certain stage, that stage becomes the final stage, in which a sorted array with all of the large number of structures in the storage unit 11 sequentially sorted is generated and the processing by the merge sort processing apparatus 10 ends.

As described above, the merge sort processing apparatus 10 in this embodiment iteratively executes the multiway merging process until all of the structures in the storage unit 11 that should be sorted are sequentially arranged in order. In a multiway merging process, structures are actually rearranged based on a single output sequence generated: structures are not always moved in the course of sorting. The structures are not collectively rearranged after sorting all the pairs either.

By rearranging structures and extracting keys every certain number of stages, this embodiment decreases overhead associated with memory copy to reduce the processing burden compared with, for example, an implementation that directly rearranges structures by sorting. It also facilitates use of SIMD instructions. Moreover, by rearranging structures and extracting keys every certain number of stages, random accesses can be avoided and occurrence of cache misses is deterred compared with, for example, an implementation which rearranges structures collectively after sorting all the pairs. It also reduces the memory bandwidth used compared with an implementation which rearranges structures collectively, for example.

In addition, due to use of multiway merge, accesses to the main memory in this embodiment are less frequent than an implementation that uses only two-way merge, for example. By way of example, when N=8 as illustrated in FIG. 4, merging in three stages would be performed in the cache memory. Accordingly, the number of accesses to the main memory is one third of a case in which only two-way merge is used. This results in a reduced consumption of the memory bandwidth, so improvement in performance can be achieved in parallel sorting in which the memory bandwidth can be a bottleneck.

In the foregoing example, the input sequence producing unit 12 pairs the key from a structure with an index to produce an input sequence for multiway merge. In such an embodiment, in order to identify all of the structures present in the storage unit 11, at least indices as many as the number of the structures should be prepared. That is, when the total number of structures is M, for example, log 2M bits will be assigned to indices. The number of bits assigned to indices increases as the data volume grows and the total number of structures increases.

In consideration of the fact, this embodiment sequentially assigns numbers to the input sequences for multiway merge, that is, the input sequence to be merged in the initial stage by multiway merge, and uses the numbers as indices, instead of using values corresponding to the total number of structures as indices. Then, indices as many as the number of the input sequences to be merged at the initial stage (=N) will suffice, so log 2N bits may be assigned to indices.

For SIMD instructions, e.g., 128-bit SIMD instructions, the number of bits that can be processed per instruction is fixed. For example, when the number of bits of the index based on the total number of structures is 32 bits and the number of bits of the key is 32 bits, the number of bits of the pair will be 64 bits. Consequently, two-parallel processing is carried out with SIMD instructions. In contrast, when the number of bits of the index is determined on the basis of input sequences as in this embodiment, if N=8, numbers from 0 to 7 are assigned to the respective input sequences for merging in the first stage and 3(log 28) bits are assigned to the index. If a lower-order bit portion of the key is removed to make it 29 bits, the number of bits of the pair will be 32 bits. This means that four-parallel processing would be performed with SIMD instructions, increasing the number of parallel processes from two to four.

Figure 5:
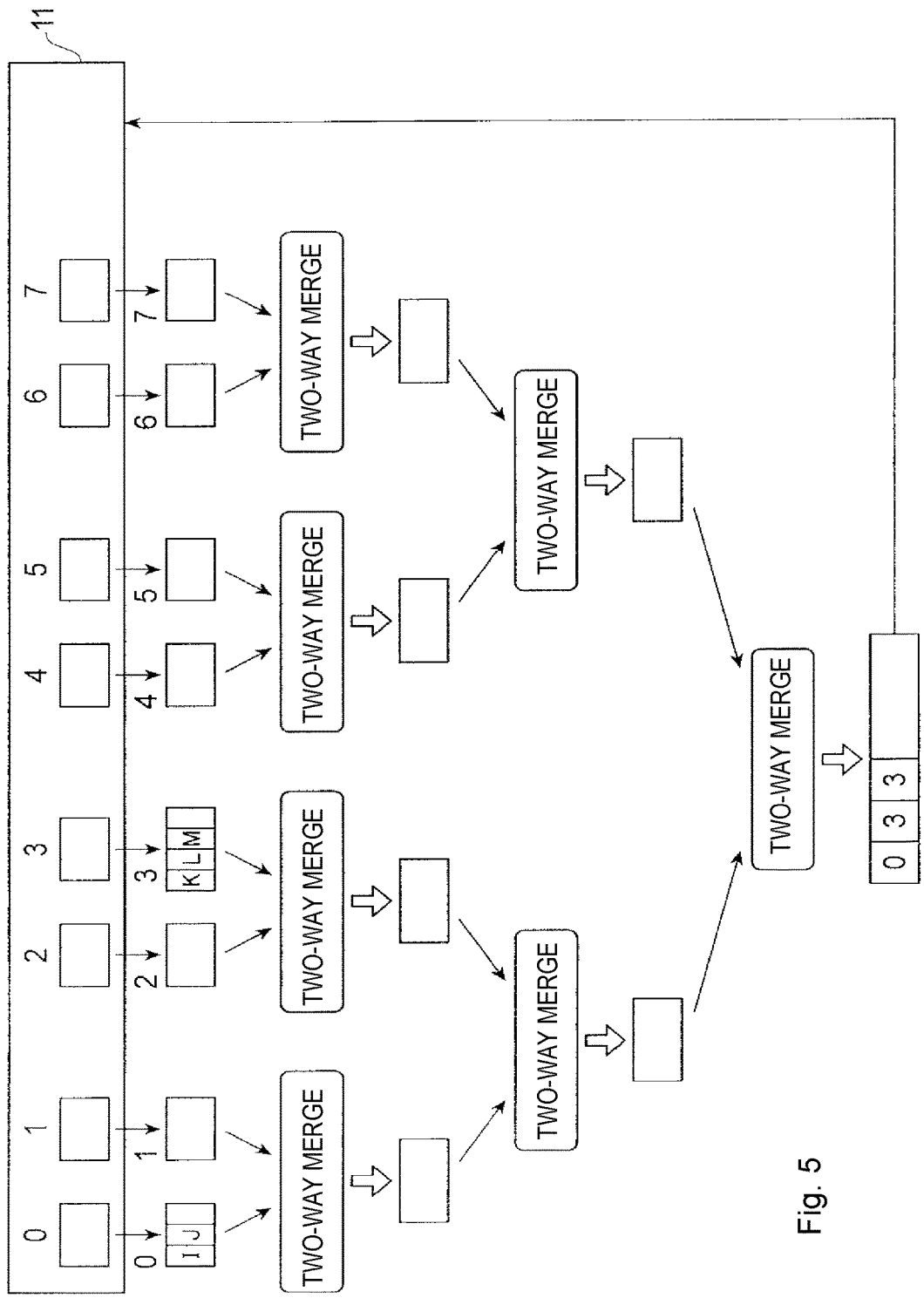
FIG. 5 is a diagram for describing an exemplary process of determining indices based on input sequences.

FIG. 5 is a diagram for describing an exemplary process of determining indices based on input sequences. In the example illustrated in FIG. 5, the number of input sequences N is eight and numbers from 0 to 7 are given to the input sequences for merging in the initial stage of multiway merge. When an input sequence contains multiple pairs, the same number is assigned to the pairs contained in the input sequence. When structures are rearranged based on output sequences resulting from multiway merge, a pointer is set at the first element of each input sequence in the first stage. Then, pairs are output from the input sequences according to the indices in the output sequences and also the pointer indicating the first element is moved to the next pair in the input sequences one by one.

As an example, in the last output sequence shown in FIG. 5, the first three higher-order indices are 0, 3, and 3 in sequence. Also, a pointer is set at the first element in each of the input sequences. In this situation, the first "0" in the output sequence corresponds to the input sequence having number "0" in the initial stage, so pair I, which is located first and has the pointer set in the input sequence with number "0", is output, and the pointer is moved to the next pair J. Next, the second "3" in the output sequence corresponds to the input sequence having number "3" in the initial stage, so pair K, which is located first and has the pointer set in the input sequence with number "3", is output, and the pointer is moved to the next pair L. Next, the third "3" in the output sequence corresponds to the input sequence having number "3" in the initial stage, so pair L, which is located first and has the pointer set in the input sequence with number "3", is output, and the pointer is moved to the next pair M. In such a manner, a pair in an input sequence corresponding to a pair in an output sequence can be identified without use of indices corresponding to individual structures, so structures in the storage unit 11 are identified and rearranged.

As described above, rather than using values corresponding to the total number of structures as indices, this embodiment uses values corresponding to the number of input sequences for multiway merge. Thus, the number of bits of the index remains the same unless the number of input sequences is changed even when the data volume has grown and the total number of structures has increased. In addition, reducing the number of bits of the pair in response to a decrease in the number of bits of the index can increase the level of parallelism with SIMD instructions.

Consider now a case in which the number of bits of the key is 32 bits and a lower-order bit portion of the key is removed to make the key 29 bits in order to make the pair 32 bits. It is then possible that keys are determined to have the same value with 29 bits but have different values when seen with 32 bits. That is, due to removal of a lower-order bit portion of the key, keys that originally have different values could be determined to have the same value. Such a determination can lead to an erroneous rearrangement in a merging process.

Thus, when merging is conducted with a reduced number of bits of the actual key, processing for checking whether the result of merge is correct or not using the original key values without a lower-order portion removed is performed. For example, before rearranging structures based on output sequences generated by multiway merge, the rearrangement execution unit 14 performs processing for checking if the result of merge in the output sequences is correct or not by comparing the original key values of the pairs contained in the output sequences. Alternatively, the rearrangement execution unit 14 may check whether the result of rearranging and sorting is correct or not by comparing original key values after processing at each stage is completed and a sorted array with all of a large number of structures sequentially sorted is generated in the final stage, for example.

The merge control unit 15 may also vary the number of bits of the key depending on the number of structures contained in input sequences. More specifically, until the number of structures in input sequences reaches a predetermined threshold, the merge control unit 15 determines the number of bits of the key so that the number of bits of the pair is a 32-bit integer, for example. When the number of structures in input sequences exceeds the predetermined threshold after execution of some stages of multiway merging, the merge control unit 15 determines the number of bits of the key so that the number of bits of the pair is a 64-bit integer, for example. In this embodiment, the first number of bits for a combination of a pair and an index is 32 bits as an example and the second number of bits is 64 bits as an example.

In earlier stages in which the number of structures for input sequences is small in the course of execution of multiway merging in some stages, the possibility of different keys being determined to have the same value is low even if the number of bits of the key is reduced in order to allocate a lower-order bit portion of the key to the index. Thus, when the number of structures for input sequences is below the predetermined threshold, four-parallel processing becomes possible with 128-bit SIMD instructions by restricting the number of bits of the pair to 32 bits, for example.

As the number of structures for input sequences increases after execution of some stages of multiway merging, the possibility of different keys being determined to have the same value becomes higher only with the bits on the higher order side of the keys. Accordingly, when the number of structures for input sequences is higher than the predetermined threshold, the merge control unit 15 increases the number of bits for the key by increasing the number of bits of the pair from 32 bits to 64 bits. This results in the number of parallel processes with 128-bit SIMD instructions decreasing from four to two, but the possibility of erroneous rearrangements during merging is low compared with when the number of bits of the key is not increased.

Figure 6:
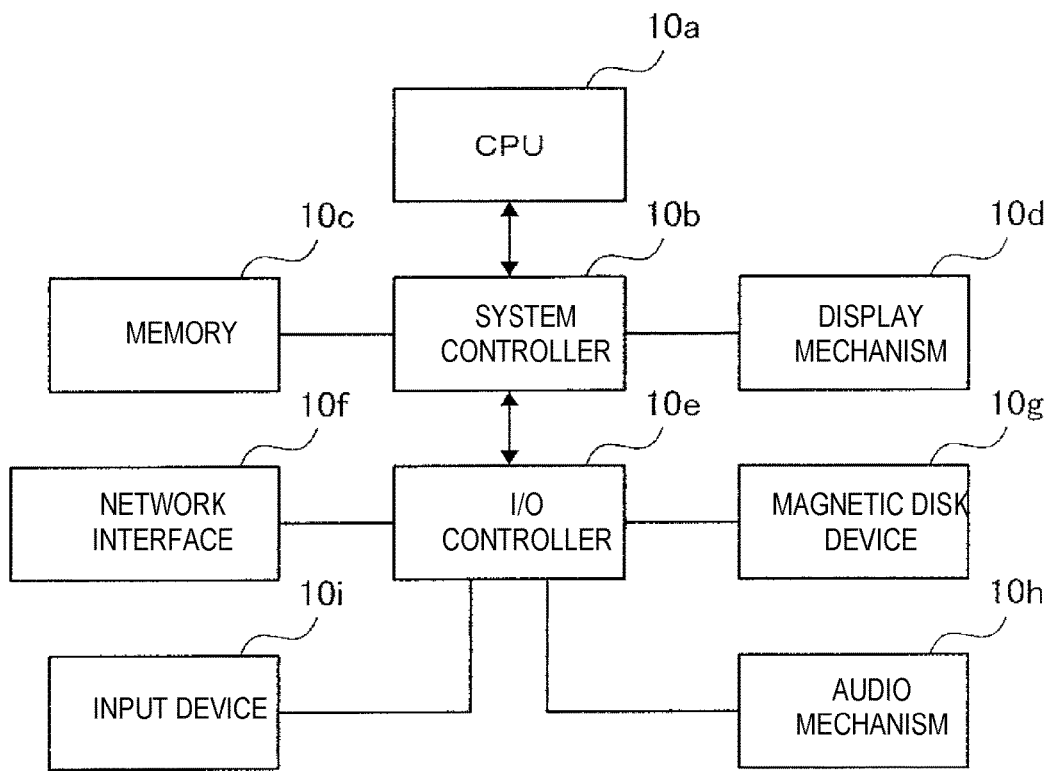
FIG. 6 shows an exemplary hardware configuration suited for implementing the merge sort processing apparatus according to the embodiment.

Finally, the hardware configuration of the merge sort processing apparatus 10 will be discussed. FIG. 6 illustrates an exemplary hardware configuration suited for implementing the merge sort processing apparatus 10 in this embodiment. The description provided herein assumes that it is applied to a computer. The computer shown in FIG. 6 includes a CPU 10a as computation means and memory 10c as main storage means. It also includes a magnetic disk device (a hard disk drive, or HDD) 10g, a network interface 10f, a display mechanism 10d including a display device, an audio mechanism 10h, an input device 10i such as a keyboard and mouse, and the like, as external devices.

In the exemplary configuration shown in FIG. 6, the memory 10c and the display mechanism 10d are connected with the CPU 10a via a system controller 10b. The network interface 10f, the magnetic disk device 10g, the audio mechanism 10h, and the input device 10i are connected with the system controller 10b via an I/O controller 10e. The components are interconnected by a variety of buses such as system buses and input/output buses.

In FIG. 6, an OS program and/or application programs are stored in the magnetic disk device 10g. By these programs being read into the memory 10c and executed by the CPU 10a, the functionality of the input sequence producing unit 12, the merge execution unit 13, the rearrangement execution unit 14, the merge control unit 15 of the merge sort processing apparatus 10 in this embodiment is realized. Also, storage means such as the memory 10c, for example, implements the storage unit 11.

It should be noted that FIG. 6 is only an illustrative example of the hardware configuration of a computer suitable for application of this embodiment. This embodiment is widely applicable to apparatuses having the ability to perform merge sorting on an array consisting of a large quantity of data by means of multiway merge, and the illustrated configuration is not the only configuration in which this embodiment can be implemented.

While this embodiment was described as executing merging by use of SIMD instructions, the present invention is not limited thereto. Use of SIMD instructions enables parallel processing and efficient execution of merging. When SIMD instructions are not used in this embodiment, advantages from parallel processing with SIMD instructions cannot be gained but overhead associated with memory copy or occurrences of cache misses, for example, are still reduced.

In addition, although the merge sort processing apparatus 10 in this embodiment was described as executing the multiway merging process using each set of N structures as the base of input sequences among a large number of structures in the initial stage in which the merge sort processing apparatus 10 starts processing, the present invention is not limited thereto. For example, the merge sort processing apparatus 10 may perform processing for sorting the structures in an array consisting of a large number of structures using a different algorithm from the merge sort employed in this embodiment and thereafter perform the processing at the initial stage of the merge sorting process according to this embodiment. In such an implementation, in the processing for the multiway merging process in the initial stage according to this embodiment, processing for generating a single output sequence from N input sequences would be performed, where one structure or one sorted array in which multiple structures are sorted makes an input sequence. The merge sort processing apparatus 10 would also iteratively perform the multiway merging process multiple times in the initial stage in accordance with a structure in an array consisting of a large number of structures and the number of sorted arrays.

While the present invention has been described with reference to its embodiment, the technical scope of the invention is not limited to the embodiment. It will be apparent to those skilled in the art that various modifications or alternatives may be adopted within the spirit and scope of the present invention.

If the number of input sequences is less than N in the series of processes defining the unit of processing, the execution unit may execute the multiway merging process on the less than N input sequences, and the generation unit may rearrange the elements, based on which the input sequences have been produced, in accordance with the output sequence that has been generated based on the less than N input sequences so as to generate a sorted array.

For the indices, numbers that are sequentially assigned to input sequences for the multiway merging process may be used.

In the apparatus, until the number of elements contained in input sequences for the multiway merging process reaches a predetermined threshold, the number of bits of the key may be determined so that a combination of the key and the index has a first number of bits, and when the number of elements exceeds the predetermined threshold, the number of bits of the key may be determined so that the combination has a second number of bits which is greater than the first number of bits.

In the apparatus, the first number of bits may be 32 and the second number of bits may be 64.

In the series of processes defining the unit of processing, the multiway merging process may be executed using SIMD instructions.

What is claimed is:

1. An apparatus, the apparatus comprising:
an input sequence production unit configured to produce an input sequence by pairing a key from an element for use in a comparison during sorting with an index identifying the element for each element or sorted array of elements;
an execution unit configured to execute the multiway merging process on N input sequences without rearranging the elements based on which input sequences have been produced;
a generation unit configured to rearrange the elements constituting the input sequences according to an output sequence that has been generated by the multiway merging process in the execution unit so as to generate a sorted array of elements; and
a number of bits of the key determined so that a combination of the key and the index has a first number of bits until the number of elements contained in input sequences for the multiway merging process reaches a predetermined threshold, and when the number of elements exceeds the predetermined threshold, the number of bits of the key is determined so that the combination has a second number of bits which is greater than the first number of bits.

2. The apparatus according to claim 1, wherein N is an integer equal to or greater than 3.

3. The apparatus according to claim 1, wherein a unit of processing is defined as a series of processes including the execution unit executing the multiway merging process and the generation unit rearranging the elements, based on which input sequences have been produced, according to an output sequence generated so as to generate a sorted array and the unit of processing is executed in a plurality of stages in sequence.

4. The apparatus according to claim 3, wherein for the unit of processing performed at an initial stage among the plurality of stages, processing by the execution unit on each set of N input sequences is iteratively executed multiple times in accordance with a number of elements contained in the array consisting of a large number of elements and the number of sorted arrays, where one element in the array consisting of a large number of elements or one sorted array of elements makes an input sequence, and the generation unit rearranges the elements, based on which input sequences have been produced, in accordance with the plurality of output sequences generated so as to generate a plurality of sorted arrays.

5. The apparatus according to claim 4, wherein for the unit of processing performed at each stage following the unit of processing at the initial stage, processing by the execution unit is executed for each set of N sorted arrays among the sorted arrays that have been generated by the multiway merging process in the unit of processing at a preceding stage, the processing by the execution unit being executed once or multiple times in accordance with the number of the sorted arrays that have been generated.

6. The apparatus according to claim 1, wherein if only one output sequence is generated, the generation unit rearranges the large number of elements in accordance with the one output sequence generated so as to generate a sorted array in which all of the large number of elements are sequentially sorted.

7. The apparatus according the claim 1, wherein if a plurality of output sequences are generated by the execution unit, the generation unit rearranges the elements constituting each input sequence in accordance with the plurality of output sequences generated so as to generate a plurality of sorted arrays which will be subjected to the multiway merging process in a following stage.

8. The apparatus according to claim 1, wherein if the number of input sequences is less than N in the series of processes defining the unit of processing,
the execution unit executes the multiway merging process on the less than N input sequences; and
the generation unit rearranges the elements, based on which input sequences have been produced, in accordance with the output sequence that has been generated based on the less than N input sequences so as to generate a sorted array.

9. The apparatus according to claim 1, wherein numbers that are sequentially assigned to input sequences for the multiway merging process are used for the indices.

10. The apparatus according to claim 1, wherein the first number of bits is 32 and the second number of bits is 64.

11. The apparatus according to claim 1, wherein in the series of processes defining the unit of processing, the multiway merging process is executed using SIMD instructions.

12. A computer-implemented method, the method comprising:
   producing an input sequence by pairing, per element or sorted array of elements, a key from an element for use in a comparison during sorting with an index identifying the element;
   executing the multiway merging process on N input sequences without rearranging the elements based on which input sequences have been produced;
   rearranging the elements, based on which the input sequences have been produced, according to an output sequence that has been generated by the multiway merging process in the executing step so as to generate a sorted array of elements; and
   determining a number of bits of the key so that a combination of the key and the index has a first number of bits until the number of elements contained in input sequences for the multiway merging process reaches a predetermined threshold, and when the number of elements exceeds the predetermined threshold, determining the number of bits of the key so that the combination has a second number of bits which is greater than the first number of bits.

13. The method according to claim 12, wherein N is an integer equal to or greater than 3.

14. The method according to claim 12, wherein a unit of processing is defined as a series of processes including executing the multiway merging process in the executing step and rearranging the elements, based on which the input sequences have been produced, according to an output sequence generated so as to generate a sorted array in the generating step, and the unit of processing is executed in a plurality of stages in sequence.

15. The method according to claim 14, wherein if a plurality of output sequences are generated in the executing step, the generating step rearranges the elements, based on which input sequences have been produced, in accordance with the plurality of output sequences generated so as to generate a plurality of sorted arrays which will be subjected to the multiway merging process in a following stage.

16. The method according to claim 14, wherein if only one output sequence is generated, the generating step rearranges the large number of elements in accordance with the one output sequence generated so as to generate a sorted array in which all of the large number of elements are sequentially sorted.

17. A computer program product, the computer program product comprising:
   one or more computer readable hardware storage devices and program instructions stored on the one or more computer readable hardware storage devices, the program instructions comprising:
   program instructions to produce an input sequence by pairing, per element or sorted array of elements, a key from an element for use in a comparison during sorting with an index identifying the element;
   program instructions to execute the multiway merging process on N input sequences without rearranging the elements based on which input sequences have been produced;
   program instructions to rearrange the elements, based on which the input sequences have been produced, according to an output sequence that has been generated by the multiway merging process in the executing step so as to generate a sorted array of elements; and
   program instructions to determine a number of bits of the key so that a combination of the key and the index has a first number of bits until the number of elements contained in input sequences for the multiway merging process reaches a predetermined threshold, and when the number of elements exceeds the predetermined threshold, program instructions to determine the number of bits of the key so that the combination has a second number of bits which is greater than the first number of bits.

* * * * *